US006632011B1

(12) United States Patent
Henington et al.

(10) Patent No.: US 6,632,011 B1
(45) Date of Patent: Oct. 14, 2003

(54) MIXING APPARATUS

(75) Inventors: Paul Henington, Tsuen Wan (HK); Kwok Wai Wen, Shatin (HK)

(73) Assignee: Process Automation International Limited (HK)

( * ) Notice: Subject to any disclaimer, the term of this patent is extended or adjusted under 35 U.S.C. 154(b) by 0 days.

(21) Appl. No.: 09/599,536

(22) Filed: Jun. 23, 2000

(30) Foreign Application Priority Data

Mar. 21, 2000 (CN) .......................................... 00105420

(51) Int. Cl.[7] ......................... G05D 11/13; B01F 15/02; C25B 15/08

(52) U.S. Cl. ................. 366/152.4; 366/136; 366/174.1; 422/275; 422/281; 210/198.1; 210/522

(58) Field of Search .......................... 366/152.4, 151.1, 366/183.2, 171.1, 174.1, 181.1, 136, 137; 422/261, 264, 268, 275, 208, 902, 272, 274; 209/169; 210/522, 521, 208, 198.1; 29/DIG. 12; 204/232, 237, 238, 240, 261, 273, 276

(56) References Cited

U.S. PATENT DOCUMENTS 367,308 A * 7/1887 Macnab et al. ............. 210/521
1,197,067 A * 9/1916 Schieren ..................... 422/274

(List continued on next page.)

OTHER PUBLICATIONS

Henington et al., Patent Application Ser. No. 09/599,537, filed Jun. 23, 2000 (unpublished).

*Primary Examiner*—Tony G. Soohoo
(74) *Attorney, Agent, or Firm*—Hall, Priddy, Myers & Vande Sande

(57) ABSTRACT

A mixing apparatus 1 comprising a chamber 12 with at least one inlet 16 allowing entry of a solute and a liquid solvent, at least one outlet 52 allowing exit of a solution of said solute and solution, and at least a separator 22 having at least one generally upwardly facing surface 40 and one generally downwardly facing surface 38*a,* wherein said surfaces define a passageway 50 allowing the solution of the solute and the solvent to pass through and out of the chamber 12, and wherein undissolved solute is descendable along the generally upwardly facing surface 40*a*.

16 Claims, 9 Drawing Sheets

U.S. PATENT DOCUMENTS

| | | | | | |
|---|---|---|---|---|---|
| 1,471,332 | A | * | 10/1923 | Greenawalt | 209/169 |
| 1,720,549 | A | * | 7/1929 | Gilchrist | 366/171.1 |
| 1,736,890 | A | * | 11/1929 | Sweeney | 422/274 |
| 2,058,300 | A | * | 10/1936 | Cramer et al. | 422/261 |
| 2,108,482 | A | | 2/1938 | Greene | |
| 2,270,372 | A | * | 1/1942 | Hunter | 422/902 |
| 2,274,401 | A | * | 2/1942 | Dromgold | 209/169 |
| 2,281,140 | A | * | 4/1942 | Courthope et al. | 422/261 |
| 2,288,791 | A | * | 7/1942 | Culliton | 422/274 |
| 2,387,488 | A | * | 10/1945 | Acken et al. | |
| 2,557,841 | A | | 6/1951 | Preusser | |
| 2,738,323 | A | * | 3/1956 | Tepas, Jr. | 422/274 |
| 3,032,199 | A | * | 5/1962 | Sumiya | |
| 3,254,877 | A | | 6/1966 | Goodwin | |
| 3,343,919 | A | * | 9/1967 | Miller | 422/902 |
| 3,390,402 | A | * | 6/1968 | Goerg | |
| 3,615,025 | A | * | 10/1971 | Rice et al. | 210/208 |
| 3,893,659 | A | | 7/1975 | Krish | |
| 3,936,274 | A | * | 2/1976 | Leverenz et al. | 422/261 |
| 3,980,282 | A | * | 9/1976 | Burch et al. | 366/171.1 |
| 4,039,449 | A | * | 8/1977 | Soriente | 210/522 |
| 4,056,477 | A | * | 11/1977 | Ravitts | 210/522 |
| 4,099,267 | A | * | 7/1978 | King | 366/181.1 |
| 4,120,796 | A | * | 10/1978 | Huebner | 210/522 |
| 4,141,656 | A | | 2/1979 | Mian | |
| 4,151,084 | A | * | 4/1979 | Probstein et al. | 210/97 |
| 4,165,279 | A | * | 8/1979 | Dell | 209/169 |
| 4,213,865 | A | * | 7/1980 | Wagner | 210/522 |
| 4,224,157 | A | * | 9/1980 | Jain | 210/208 |
| 4,278,545 | A | * | 7/1981 | Batutis et al. | 210/521 |
| 4,290,898 | A | * | 9/1981 | von Hagel et al. | 210/208 |
| 4,400,280 | A | * | 8/1983 | Larsson et al. | 210/802 |
| 4,650,339 | A | | 3/1987 | Chetcuti | |
| 4,738,540 | A | | 4/1988 | Banks | |
| 4,747,948 | A | * | 5/1988 | North | 210/633 |
| 4,755,061 | A | | 7/1988 | Goins | |
| 5,169,406 | A | * | 12/1992 | Tewari | 422/902 |
| 5,380,417 | A | * | 1/1995 | Essop et al. | 204/269 |
| 5,399,014 | A | | 3/1995 | Takata et al. | |
| 5,445,193 | A | | 8/1995 | Koeninger et al. | |
| 5,512,265 | A | * | 4/1996 | Funahashi et al. | 422/261 |
| 5,782,556 | A | * | 7/1998 | Chu | 366/171.1 |
| 6,228,230 | B1 | | 5/2001 | Li et al. | |
| 6,357,906 | B1 | * | 3/2002 | Baudoin et al. | 366/136 |

* cited by examiner

MIXING APPARATUS

This invention relates to an electroplating apparatus and, in particular, such an electroplating apparatus which comprises means for facilitating mixing and dissolution of a solute in a solvent, and minimising the amount of undissolved solutes to be carried away from a mixing chamber, e.g. into a chamber of the apparatus where electroplating takes place.

Prior electroplating apparatus is known. An example of prior electroplating apparatus consists of two housings wherein a respective chamber is located therein. A first chamber is for dissolving solutes in a solvent to form an electrolyte solution. The solution is then delivered to a second chamber in which electroplating occurs.

One problem associated with this conventional type of apparatus is that undissolved solute in the first chamber may be delivered, together with the electrolyte solution, to the second chamber. This not only contaminates the second chamber with undissolved solute, which will affect the electroplating process, it is also uneconomical as additional solute is needed to compensate the undissolved solute which is unused for the intended purpose in the second chamber.

Another problem associated with a conventional type of apparatus is that a simple stirring mechanism in the shape of a turbine arranged in a lower portion of the first chamber is often used. This design has a disadvantage in that an undesirably rough current is produced during the dissolution of the solute. Undissolved solute may undesirably be brought to an upper portion of the first chamber by the rough current and carried away from the first chamber.

The present invention seeks to provide an improved mixing apparatus as well as an improved electroplating apparatus which mitigates the disadvantages of the prior art apparatus while affording additional operating advantages.

According to a first aspect of the present invention, there is provided an apparatus useful for mixing comprising a chamber with at least one inlet allowing entry of a solute and a liquid solvent, at least one outlet allowing exit of a solution of the solute and solvent, and at least a separator having at least one generally upwardly facing surface and one generally downward facing surface, wherein the at least one generally upwardly facing surface and the at least one generally downwardly facing surface form at least part of a passageway allowing said solution to pass through and out of the chamber, and wherein undissolved solute is descendable along the generally upwardly facing surface.

Preferably, the separator may include a plurality of separating members.

Advantageously, each of the separating members may comprise a plate member.

Suitably, each plate member may provide a generally upwardly facing surface and a generally downwardly facing surface.

Preferably, the plate members may be disposed side by side with each other.

Advantageously, the upwardly facing surface and downwardly facing surface may be substantially parallel to each other.

Suitably, the upwardly facing surface and the downwardly facing surface may be slanted at substantially 55–65° from a horizontal axis of the chamber.

Preferably, the upwardly facing surface and the downwardly facing surface may be slanted at substantially 60° from the horizontal axis of the chamber.

Advantageously, the mixing apparatus may further comprise a device for agitating the solvent with the solute in said chamber.

Suitably, the mixing apparatus may further comprise a device for detecting concentration of the solution, wherein the detecting device may be located below the separator.

Preferably, the mixing apparatus may further comprise at least one device for allowing the solute to reach a lower portion of the chamber before being mixed with and dissolved in the solvent.

According to a second aspect of the present invention, there is provided an apparatus as described above, wherein said apparatus is part of an electroplating apparatus.

According to a third aspect of the present invention, there is provided an apparatus as described above, wherein said apparatus is liquidly connected to a least one plating cell.

An embodiment of the present invention is now described, by way of example only, with reference to the following drawings in which.

Figure 7A:
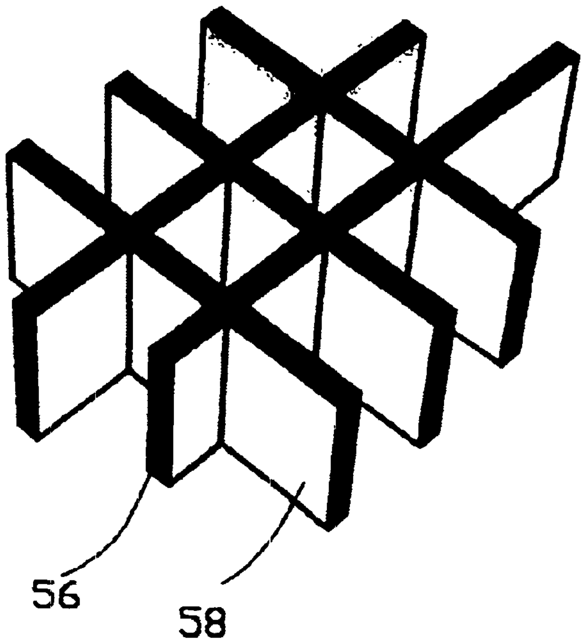
Figure 7B:
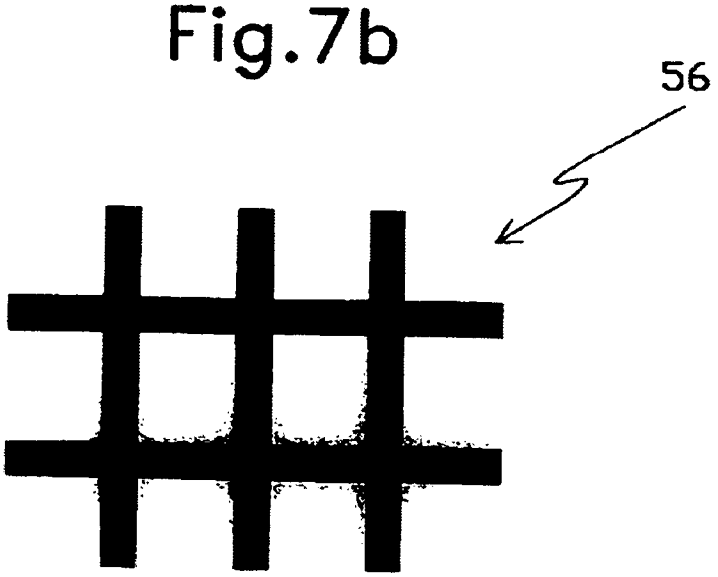

FIG. 7*a* is a perspective view showing a portion of a vortex destroyer;

FIG. 7*b* is a top view of a portion of the vortex destroyer shown in FIG. 7*a;*

Figure 2:
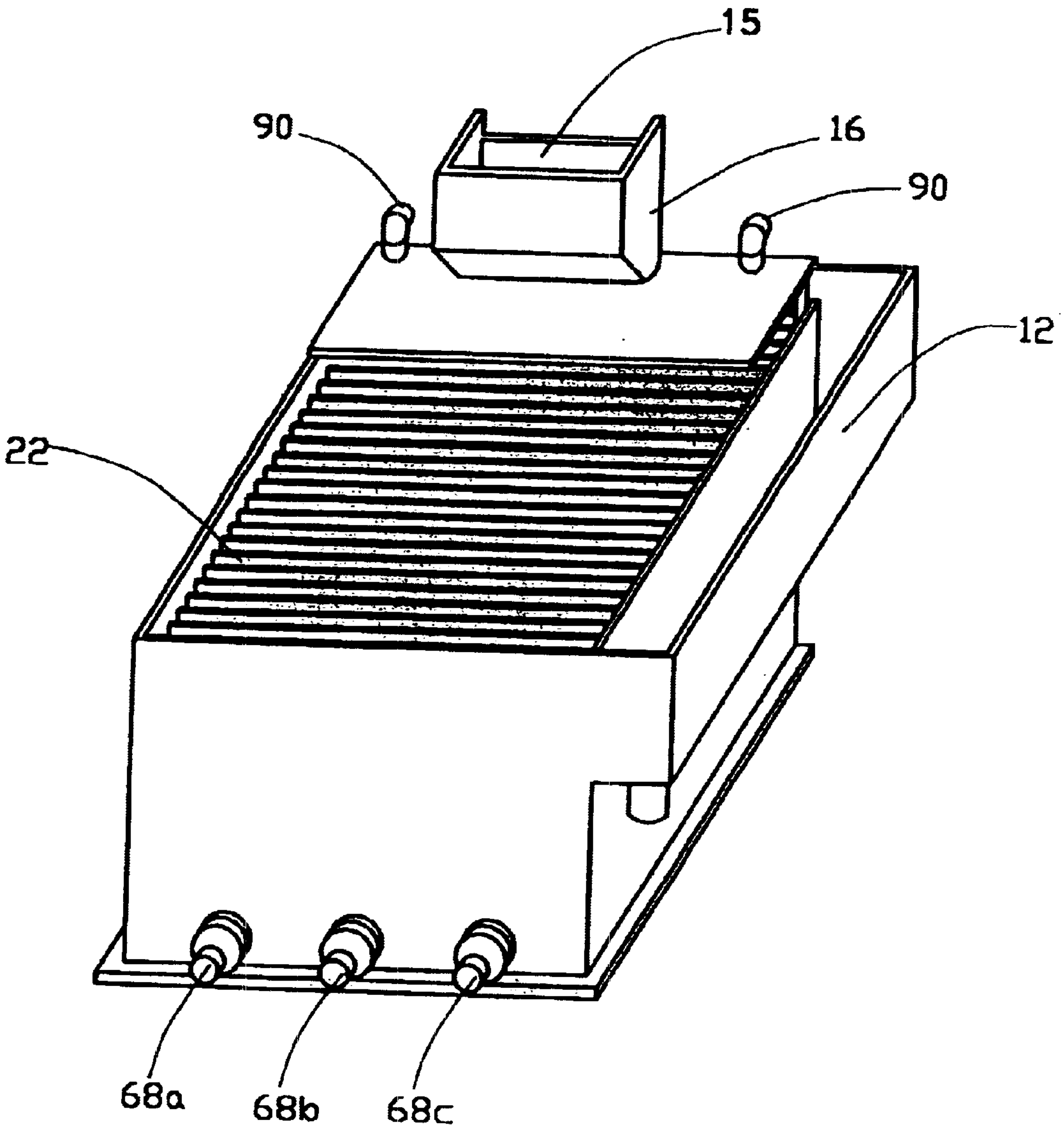
FIG. 2 is a perspective view of a mixing chamber of the electroplating apparatus shown in FIG. 1.
Figure 8:
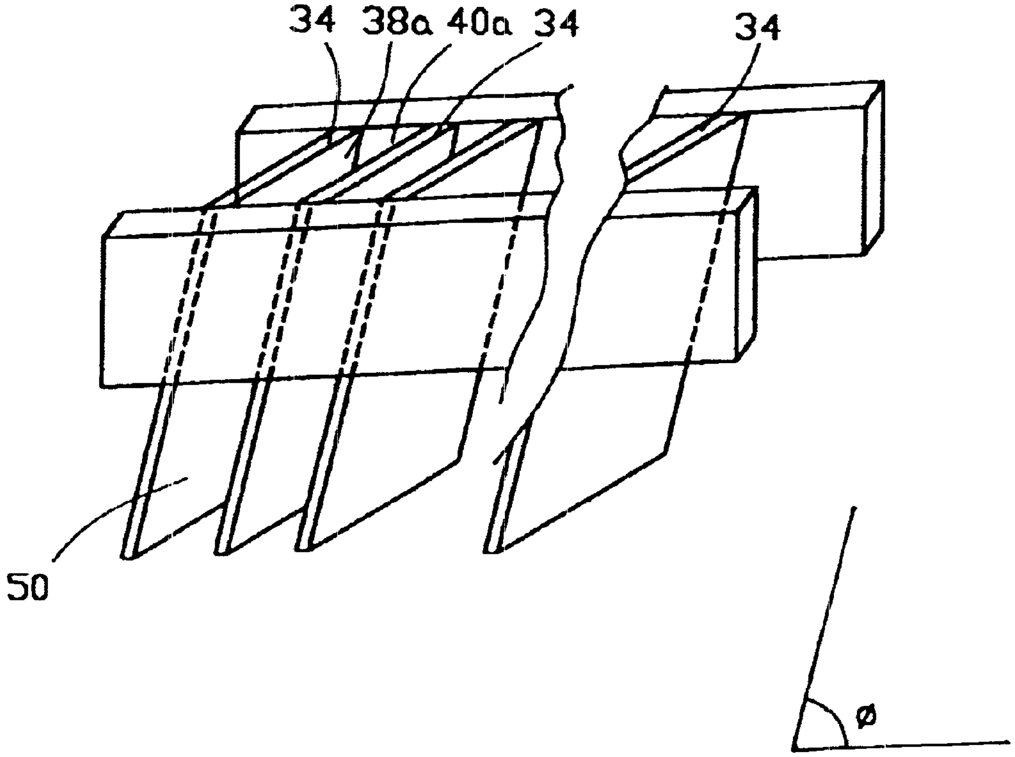
Figure 9A:
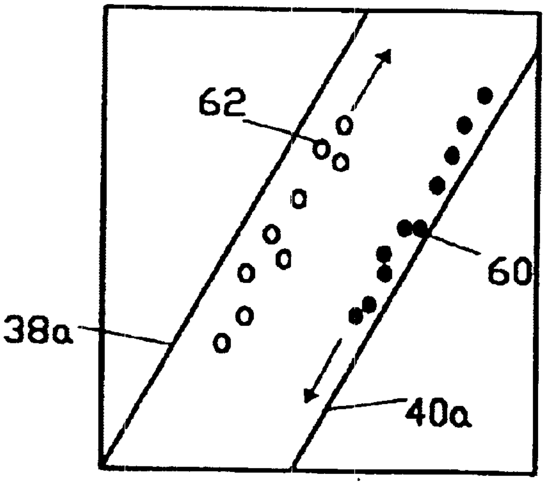
Figure 9B:
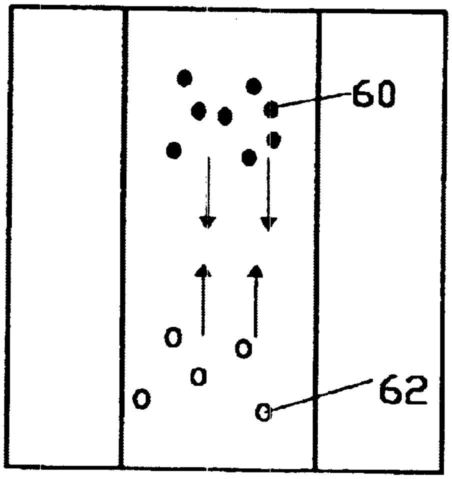

FIG. 8 is a perspective view showing a portion of a separator of the mixing chamber shown in FIG. 2;

FIG. 9*a* is a cross sectional view of a portion of the separator shown in FIG. 2;

FIG. 9*b* is a cross sectional view of a portion of a separator having a different construction as compared to FIG. 9*a*.

Figure 1:
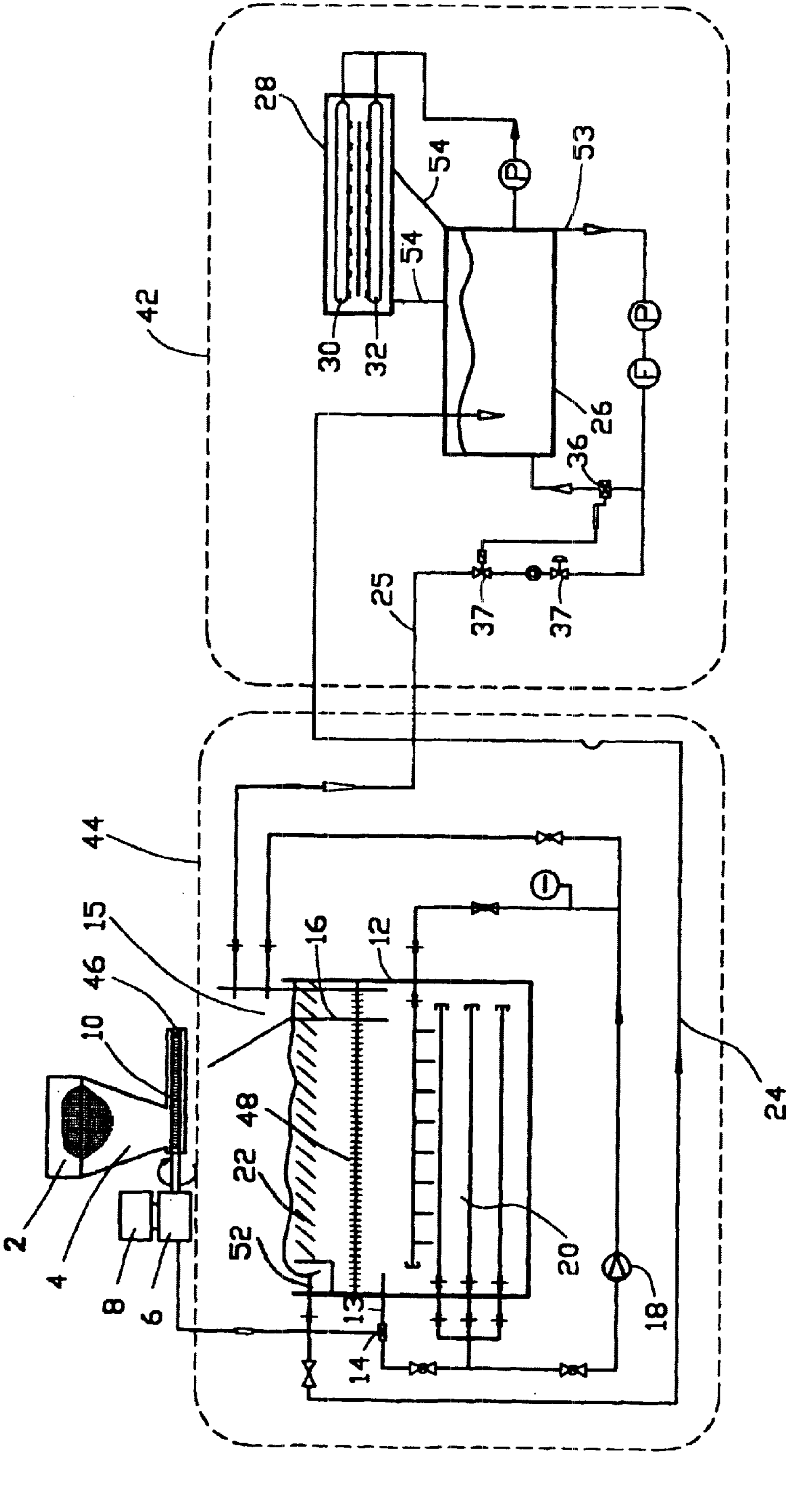
FIG. 1 is a schematic diagram showing a cross section of an electroplating apparatus according to the present invention.
Figure 10A:
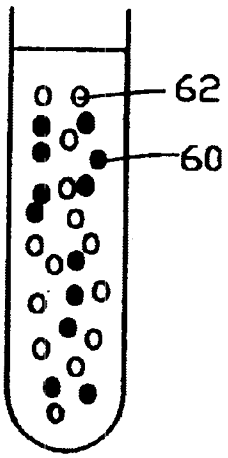
Figure 10B:
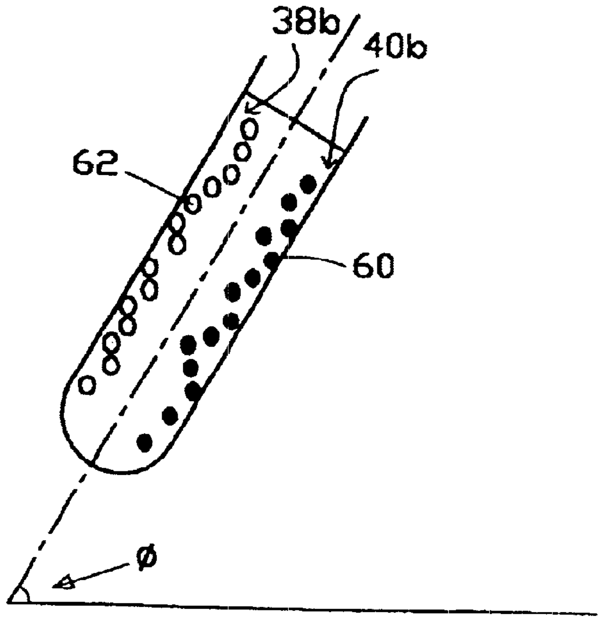

FIG. 10*a* shows a test tube in which a solute is dissolved in a solvent contained therein; and FIG. 10*b* shows another test tube in a tilted position in which a solute is dissolved in a solvent contained therein;

An embodiment of an electroplating apparatus 1 according to the present invention is shown in FIG. 1. The electroplating apparatus 1 can generally be divided into two zones, namely a high concentration zone 44 in which a mixing chamber 12 is located, and a low concentration zone 42 in which a plating sump 26 and a plating cell 28 are located. Above the mixing chamber 12 is provided a feeder 2 driven by a DC motor 6 which is in turn powered by a power supply 8. The feeder 2 is generally in the form of a chamber with a narrower lower portion within which a further filter 4 (not shown) is comprised. Solute (e.g. solid CuO powder) contained in the housing of the feeder 2 is filtered through the filter 4 before being transported to an outlet 46 of the feeder 2 via a screw feeder 10.

The mixing chamber 12 is generally rectangular, as shown in FIGS. 1 and 2. While the mixing chamber 12 as shown is generally in the shape of a rectangular tank, a different configuration of the mixing chamber 12 may be used. An elongate tube 16 with an inlet 15 having an enlarged opening is arranged on one side of the mixing chamber 12. The mixing chamber 12 further comprises a separator 22 and a vortex destroyer 48. The elongate tube 16 is substantially parallel to the vertical axis of the mixing chamber 12 while the separator 22 and the vortex destroyer 48 are arranged horizontally across the mixing chamber 12. As can be seen, the mixing chamber 12 generally comprises the separator 22 located in an upper portion, the vortex destroyer 48 in a middle portion and a mixing mechanism 20 in a lower portion thereof. The mixing mechanism 20 of the mixing chamber 12 will be described in more detail.

Still referring to FIG. 1, the plating sump 26 is generally in the form of a tank defining a cavity therein. The plating sump 26 is of a relatively large size as compared to the mixing chamber 12. The actual capacities of the mixing chamber 22 and the plating sump 26 are approximately 200 l and 1200 l respectively, although different sizes may also be used. A channel member or pipe 24 leading from an outlet 52 attached to the upper portion of the mixing chamber 12 is connected to the plating sump 26. A further channel member or pipe 25 leading from an outlet 53 of the plating sump 26 is connected to the mixing chamber 12.

The plating cell unit 28 connected to the plating sump 26 by pipes 54 comprises a cathode 30 and an anode 32 where electroplating takes place.

As described. the electroplating apparatus 1 can generally be divided in two zones, the high concentration zone 44 and the low concentration zone 42. In use, solute contained in the feeder 2 is transported by the screw feeder 10 to the outlet 46 via the filter 4. The filter 4 is used to allow only finer particles of the solute to leave the outlet 46 and enter the elongate tube 16 extending below the vortex destroyer 46 to the lower portion of the mixing chamber 12. Electrolyte solution with a lower solute concentration from the plating sump 26 can be channelled to enter the inlet 15 of the elongated tube 16 via the pipe 25, which also serves to flush any solute dispensed from the feeder 2 which sticks to the walls of the inlet 15 down to the tube 16. Once the solute enters the tube 16 and reaches the lower portion thereof, the solute starts to come into contact with the solvent contained in the mixing chamber 12. The solute begins to dissolve in the solvent and an electrolyte solution is formed therefrom. The mixing and dissolution of the solute with and in the solvent is explained in more detail as follows.

Figure 3:
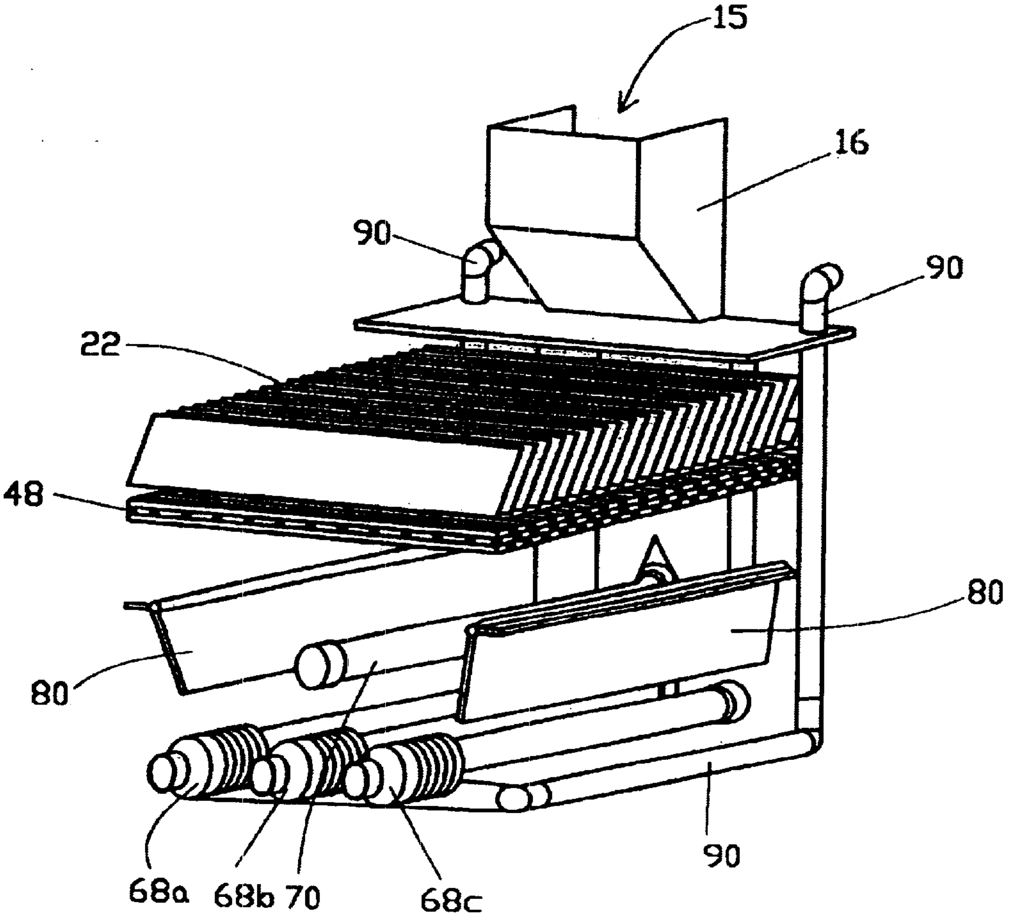
FIG. 3 is a perspective view of the mixing chamber shown in FIG. 2 with the housing removed.
Figure 4:
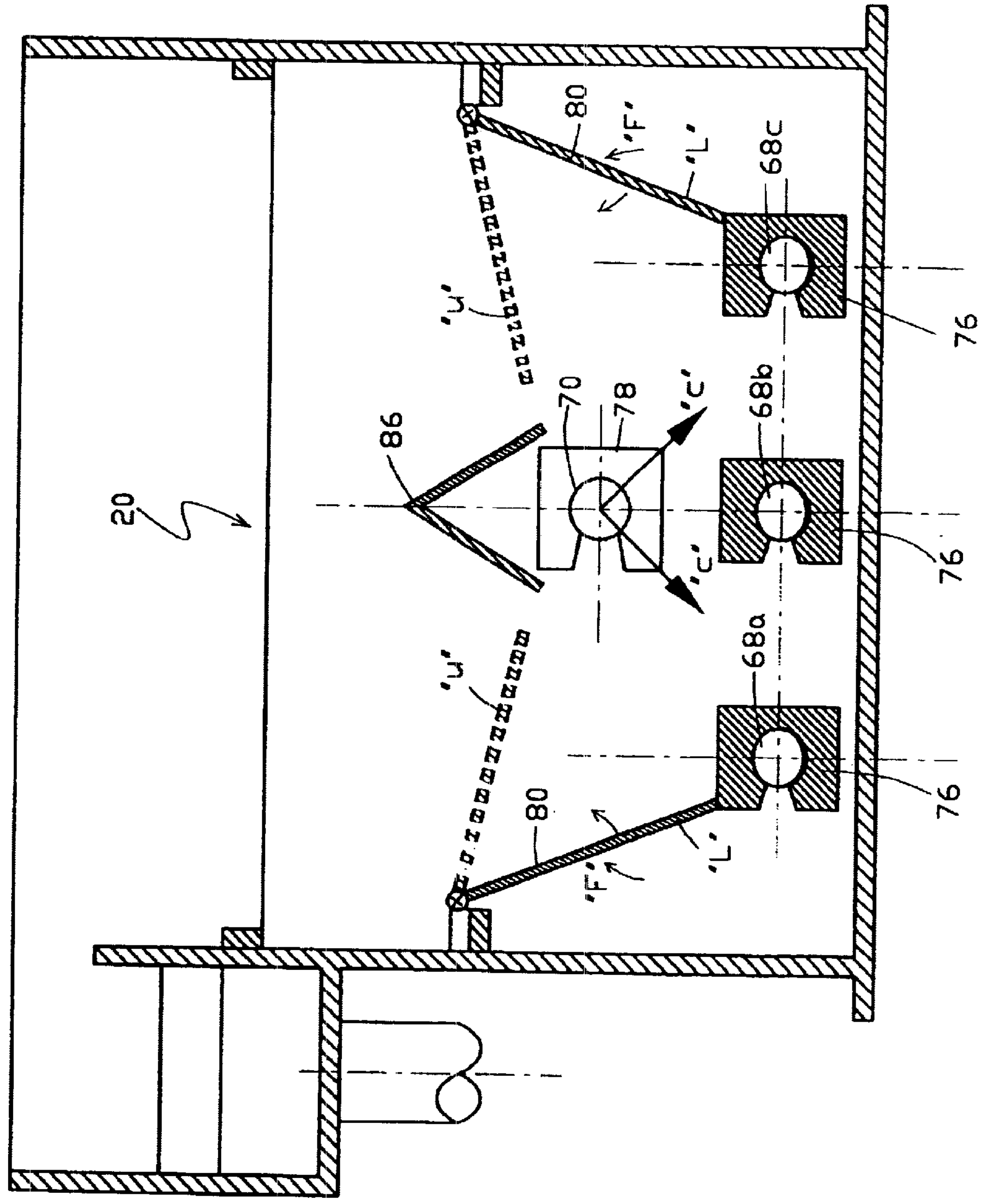
FIG. 4 is a schematic diagram showing a cross section of a lower portion of the mixing chamber shown in FIG. 2.
Figure 5:
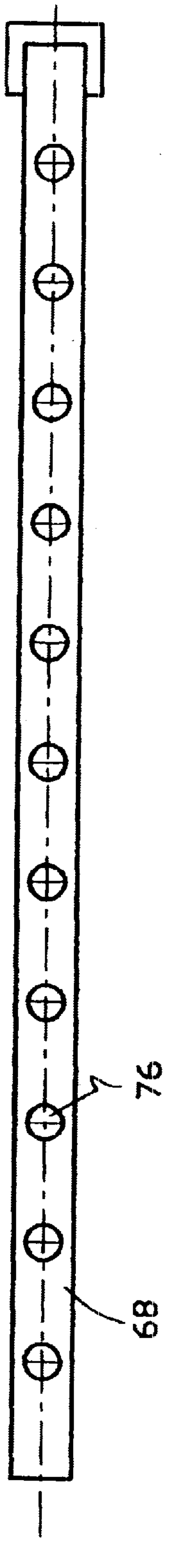
FIG. 5 is a bottom view of a suction tube as shown in FIG. 3.
Figure 6:
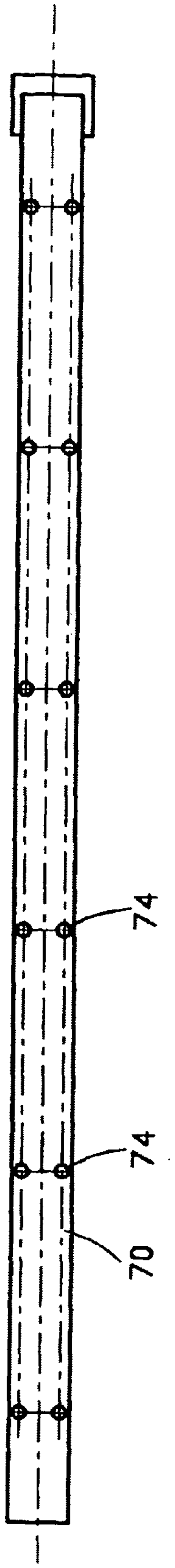
FIG. 6 is a bottom view of a sprinkler tube as shown in FIG. 3.

Referring to FIGS. 1 to 6, the mixing mechanism 20 is arranged in the lower portion of the mixing chamber 12 and is driven by a pump 18. The mixing mechanism 20 facilities the dissolution of the solute by agitating the solvent contained at the lower portion of the mixing chamber 12. The pumping of the solution via the pump 18 also facilitates the dissolution of the solute. The mixing mechanism 20 comprises three suction tubes *68a,* *68b* and *68c* arranged below a sprinkler tube 70. The suction tubes *68a,* *68b,* *68c* and the sprinkler tube 70 are secured on holders *76a,* *76b,* *76c,* 78 respectively. The sprinkler tube 70 has two rows of small openings 74 on its underside, as shown in FIG. 6, while each of the suction tubes *68a,* *68b,* *68c* has one row of openings 76 arranged on their underside, as shown in FIG. 5. The openings 76 on the suction tubes *68a,* *68b,* *68c* are larger than the openings 74 on the sprinkler tube 70. The mixing mechanism 20 further comprises two panels 80 in the form of a pair of wings pivotably secured on opposite sides of the mixing chamber 12, as shown in FIGS. 3 and 4. In use, when the mixing chamber 12 is filled with solvent and is in operation, the pump 18 continues to pump solvent contained in the mixing chamber 12 by drawing out the solvent via the openings 76 of the suction tubes *68a,* *68b,* *68c* and reintroducing the solvent into the mixing chamber 12 by ejecting it via the openings 74 of the sprinkler tube 70. As such, downward flowing currents are generated just below the holder 84, as indicated by the arrows "C" in FIG. 4. The downward currents "C" induce upward flowing currents, as indicated by the arrows "F", on the peripheral within the mixing chamber 12 which push the panels 80 to move from a lower position "L" to an upper position "U". A stopper 86 in the form of an inverted "V" is located right above the holder 84 of the sprinkler tube 70. The stopper 86 can be adjusted so that its legs are spread wider, which stops the panels 80 from moving further above the upper position "U". Alternatively, additional components may be added to the lower edges of the panels 80, so that such components abut against the stopper 86 when the panels are in the upper position "U".

Once the mixing apparatus 64 is in operation, the panels 80 swing upwards and maintain their upper position "U" supported by the constant upward flowing currents generated by the outputting of recirculated solvent from the sprinkler tube 68. The maintaining of the upper position of the panels 80 creates an enclosed area within the lower portion of the mixing chamber 12 where dissolution and mixing of the solute with the solvent occurs. Although the enclosed area is not perfectly water tight and thus still allows solvent to move from the lower portion of the mixing chamber 12 to the middle and upper portions of the mixing chamber 12, the rough current generated by the suction of the suction tubes 68 and the sprinkler tube 70 is substantially confined to the lower portion of the mixing chamber 12.

A sensor 14 is connected to a spectrophotometer (not shown) which constantly monitors the concentration of the solute in the solution contained in the mixing chamber 12. A tube 13 is connected to the sensor 14 which allows the flow of a small amount of solution from the mixing chamber 12 to the sensor 14. When the concentration of the solute in the mixing chamber 12 drops to a level below the value selected by a user, the DC motor 6 is initiated so that more solute is delivered to the mixing chamber 12 via the tube 16. Once the sensor 14 senses that the concentration of the solute reaches a pre-selected level, the DC motor 6 ceases to operate and delivery of fresh solute from the feeder 2 to the tube 16 is stopped.

Another sensor 36 is connected to the plating sump 26 which senses the concentration of the solute in the solution contained therein. When the concentration drops below a certain level selected by a user, valves 37 are caused to open and the solution contained in the plating sump 26 is in turn allowed to flow to the mixing chamber 12 via the channel 25. As the mixing chamber 12 is constantly kept full of the solution, the flowing of additional solution to the mixing chamber 12 causes the mixing chamber 12 to overflow. Overflowed solution is channelled from the outlet 52 to the plating sump 26 via the pipe 24. Since the plating sump 26 has a lower concentration of the solute, replacement of some of the solution contained therein with fresh solution containing a higher solute concentration will increase the overall concentration of the solute in the solution contained in the plating sump 26. Once the sensor 36 senses that the concentration of the solute in the plating sump 25 reaches above the pre-selected level, the valves 37 will shut down and flowing of solution from the plating sump 26 to the mixing chamber 12 is stopped.

The mixing apparatus further comprises a cooling mechanism having a pipe 90 carrying coolant therethrough. As shown in FIGS. 2 and 3, the coolant pipe 90 is arranged adjacent to a surface of the mixing chamber and is extended from the upper portion to the lower portion of the mixing chamber 12. During the dissolution of solute in the solvent, much heat is generated. Relatively cold water (at around 9° C.) is introduced into the tube and such water emerges from the mixing chamber 12 at a temperature of around 13° C. The cooling mechanism regulates the temperature of the solution contained in the mixing chamber 12.

The plating sump 26 requires a regulated supply of solution dissolved with a desired level of solute suitable for supplying to the plating cell 28 for electroplating. When the concentration of the plating sump 26 drops below a desired level, fresh supply of solution with a higher concentration of dissolved solute is delivered to the plating sump 26 via the outlet 52 and the channel member 24 for subsequent replenishment of the solution in the plating cell 28. The substantially larger containing capacity of the plating sump 26 relative to the mixing chamber 12 allows a more effective management of the constant concentration of the solute in the solution in the plating cell 28. This is because a large supply of higher concentration of solute in the solution is ready to meet the need of the plating cell 28.

Before the solution contained in the mixing chamber 12 is transported to the plating sump 26, it passes through the vortex destroyer 48 and the separator 22. The passage of solution through the vortex destroyer 48 and the separator 22 is explained in more detail as follows.

In order to regulate the passage of the solution across the separator 22 so as to minimise the amount of undissolved solute to be carried away from the mixing chamber 12, the vortex destroyer 48 is introduced below the separator 22, as shown in FIG. 1. Referring to FIGS. 7*a* and 7*b*, the vortex destroyer 48 is in the form of multiple layers of mesh-like ("#") structures 56. There are three layers of the mesh-like structures 56 in the present embodiment, although a different number of layer can be used depending on a number of factors including the dimensions of the mixing chamber and the vortex destroying effect desired. Each layer of the mesh-like structure 56 has a plurality of upstanding wall members 58 arranged substantially parallel to each other. The thickness of each wall 58 is 2 mm, the distance between adjacent walls 58 is 13 mm, and the height of each wall 58 is 10 mm, although a different dimension of the walls 58 may be used. The layers of the mesh-like structure 56 are arranged and stacked on top of each other so that each layer is slightly off centre in relation to the layers located above and below. This arrangement enhances the vortex destroying effect upon the current generated by the mixing mechanism 20 at the lower portion of the mixing chamber 12.

Referring to FIG. 8, the separator 22 is generally comprised of a plurality of dividing boards or plates 34 in the form of walls defining a plurality of channels 50. In particular, each channel 50 is defined by the surrounding dividing boards 34. The dividing boards 34 are preferably constructed so that opposing surfaces 38*a*, 40*a* defined by adjacent dividing boards 34 are substantially and preferably parallel to each other and slanted at approximately at 55–65° (ϕ) from the horizontal axis of the mixing chamber 12. The surfaces 38*a*, 40*a* are preferably smooth, although such may be planar or undulated. The construction of the dividing boards 34 and functions of the surfaces 38*a*, 40*a* defined thereby will be explained in more detail below.

It is found that as solute (e.g. copper oxide, $CuO_{(s)}$) is dissolved in and mixed with a solvent (e.g. $H_2SO_4$), bubbles of oxygen gas are formed during the dissolution and mixing process. Because of the lower relative density of the gas bubbles, the gas bubbles rise naturally to the upper surface of the solution in a container, i.e. the mixing chamber 12. On the other hand, because of the higher relative density of the dissolving solute, the solute particles tend to sink to the lower portion of the mixing chamber 12. However, during this process, some of the undissolved solute particles may be carried upwards by the ascending bubbles towards the upper portion of the mixing chamber 12 as shown in FIG. 9*b*. This not only prevents the complete and efficient dissolution of the solute particles preferably taking place in the lower portion of the mixing chamber 12 where the mixing mechanism 20 is located, undissolved solute particles may undesirably be transported to the plating sump 26 via the outlet 52 and the channel member 24, and eventually the plating cell 28 via channel members 54.

To mitigate the above problem, the separator 22 as described above is designed to minimize the undissolved solute particles from reaching the plating sump 26. The following experiments were carried out and the results thereof are illustrated.

Experiments 1, 2 & 3 (as shown in FIGS. 10*a* & 10*b* respectively)

Objective

To estimate the effect of inclined angle on the time of dissolution of a solute in a solvent.

Test Conditions

| Conditions | Experiment 1 | Experiment 2 | Experiment 3 (repeated 3 times) |
|---|---|---|---|
| Volume of solvent (solution) | 100 ml | 100 ml | 100 ml |
| Container used | 100 ml test tube | 100 ml test tube | 100 ml test tube |
| Temperature | room temperature | room temperature | room temperature |
| Solute used | copper (II) oxide | copper (II) dioxide | copper (II) oxide |
| Solvent used | sulphuric acid | sulphuric acid | sulphuric acid |

Procedures

Copper (II) oxide (in powder form) is added to the sulphuric acid contained (with stirring) in test tube.

Results

| | Experiment 1 | Experiment 2 | Experiment 3 (average values) |
|---|---|---|---|
| Copper oxide added | 1.6 gm | 7 gm | 7 gm |
| Position of the test tube | vertical | vertical | inclined at 60° from the horizontal axis |
| Height of clear from the surface of the solution | 90 mm | 90 mm | 50 mm |
| Time for copper oxide particles to clear (dissolve) | 10 minutes | 10 minutes | 5 minutes |

Observations

Gas bubbles 62 were observed rising while copper oxide particles 60 descended by gravity as shown in FIG. 10*a*. The rising gas bubbles appeared to slow down the descending of the copper oxide particles. It was also observed from the Experiment 3 that the gas bubbles 62 rose along an upper surface 38*b* of the test tube while the descending copper (II) oxide particles 60 moved along a lower surface 40*b* of the test tube, as shown in FIG. 10*b*.

Conclusions

By looking at the results from the above three experiments, it is concluded that the descending and dissolution of copper oxide 60 is slowed down by the rising gas bubbles, if the test tube is positioned substantially upright (as in Experiments 1 and 2). It was also found that when two oppositely facing surfaces (i.e. 38*a* & 40*a*, 38*b* & 40*b*) tilted at an angle to the vertical are provided, the descending and dissolving of the solute 60 as well as the rising of the gas bubbles 62 are facilitated. It was specifically found that an approximately 60° inclination of the test tube relative to the horizontal axis (as shown in FIG. 10*b*) provides optimal results for dissolving a solute in a solvent, although an inclination of from 55° to 65° relative to the horizontal axis will provide satisfactory results.

Based on this conclusion, the separator 22 is designed with a plurality of channels 50 for passing of the rising gas bubbles as well as descending and dissolving of the solute particles. In particular, the upwardly facing lower surface 40*a* provides a platform for the solute particles to descend during dissolution while the downwardly facing upper surface 38*a* allows the gas bubbles to rise along. This minimises the upward moving of the solute particles which may be transported to the plating sump 26.

What is claimed is:

1. A mixing apparatus comprising:

a mixing chamber with at least one inlet allowing entry of a solute and a liquid solvent, and at least one outlet located at an upper portion of said mixing chamber allowing exit of a solution of said solute and solvent;

a mixing mechanism located at a lower portion of said mixing chamber for mixing said solute with said solvent;

a separator located substantially between said mixing chamber and said outlet; said separator having at least one generally upwardly facing surface and at least one generally downward facing surface, each said surface being oriented at an incline;

said upwardly facing surface being so located and so designed such that gas bubbles produced when said mixing mechanism is operated are channeled by said upwardly facing surface in a direction generally away from said mixing mechanism; and said downward facing surface being so located and so designed such that undissolved solute is directed by said downward facing surface to an area generally proximal said lower portion of said mixing chamber.

2. An apparatus according to claim 1 wherein said separator includes a plurality of separating members.

3. An apparatus according to claim 2 wherein each of said separating members comprises a plate member.

4. An apparatus according to claim 3 wherein each said plate member provides a generally upwardly facing surface and a generally downwardly facing surface, each said surface oriented at an incline.

5. An apparatus according to claim 4 wherein said plate members are disposed side by side with each other.

6. An apparatus according to claim 3 wherein said plate members are disposed side by side with each other.

7. An apparatus according to claim 1 wherein said upwardly facing surface and said downwardly facing surface are substantially parallel to each other.

8. An apparatus according to claim 1 wherein said upwardly facing surface and said downwardly facing surface are slanted at substantially 55–65 degrees from a horizontal axis of said chamber.

9. An apparatus according to claim 1 wherein said upwardly facing surface and said downwardly facing surface are slanted at substantially 60 degrees from a horizontal axis of said chamber.

10. An apparatus according to claim 1 wherein said mixing mechanism comprises a device for agitating said solvent with said solute in said mixing chamber.

11. An apparatus according to claim 1 further comprising a detecting device for detecting a concentration of said solution, wherein said detecting device is located below said separator.

12. An apparatus according to claim 1 further comprising a device for allowing said solute to reach a lower portion of said chamber before being mixed with and dissolved in said solvent.

13. An apparatus according to claim 1 further including at least one plating cell liquidly connected to said apparatus.

14. An apparatus according to claim 1 wherein said upwardly facing surface and said downwardly facing surface define a passageway allowing said solution to pass through and out of said chamber via said outlet.

15. An apparatus according to claim 1 in combination with an electroplating apparatus for providing said solution thereto.

16. An apparatus according to claim 1 further including a vortex destroyer located between said mixing mechanism and said separator.

* * * * *